Inventors
GEORGE F. CRAVEN
ANTONI E. KARBOWIAK
By
Attorney

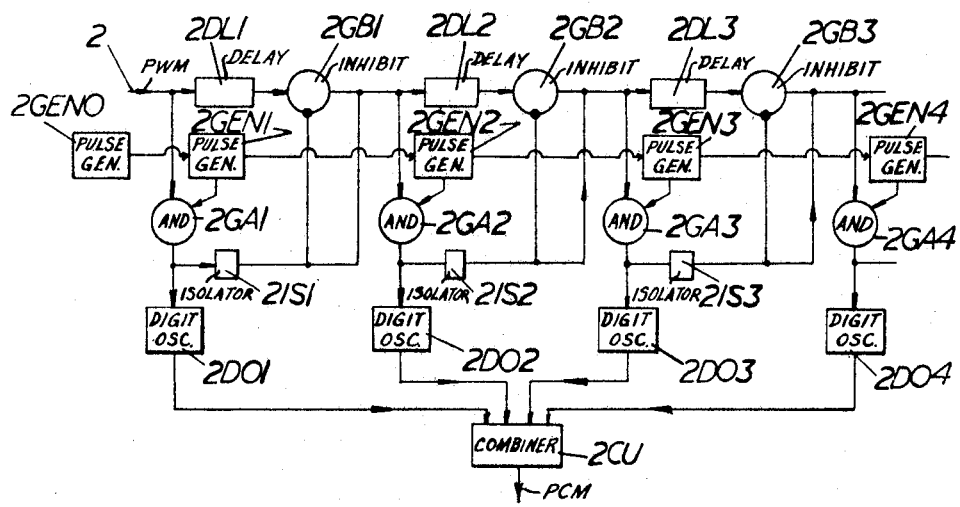
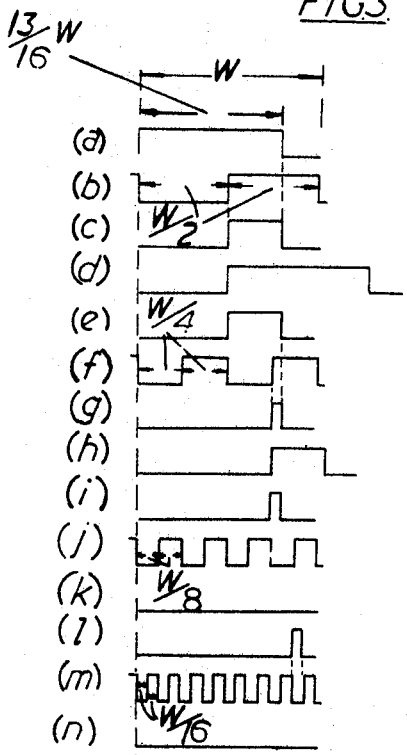

March 10, 1970  G. F. CRAVEN ET AL  3,500,387
PTM TO PCM AND PCM TO PTM CONVERSION CIRCUITRY
Filed Dec. 7, 1964  11 Sheets-Sheet 4

Inventors
GEORGE F. CRAVEN
ANTONI E. KARBOWIAK
By
Attorney

March 10, 1970  G. F. CRAVEN ET AL  3,500,387
PTM TO PCM AND PCM TO PTM CONVERSION CIRCUITRY
Filed Dec. 7, 1964  11 Sheets-Sheet 6
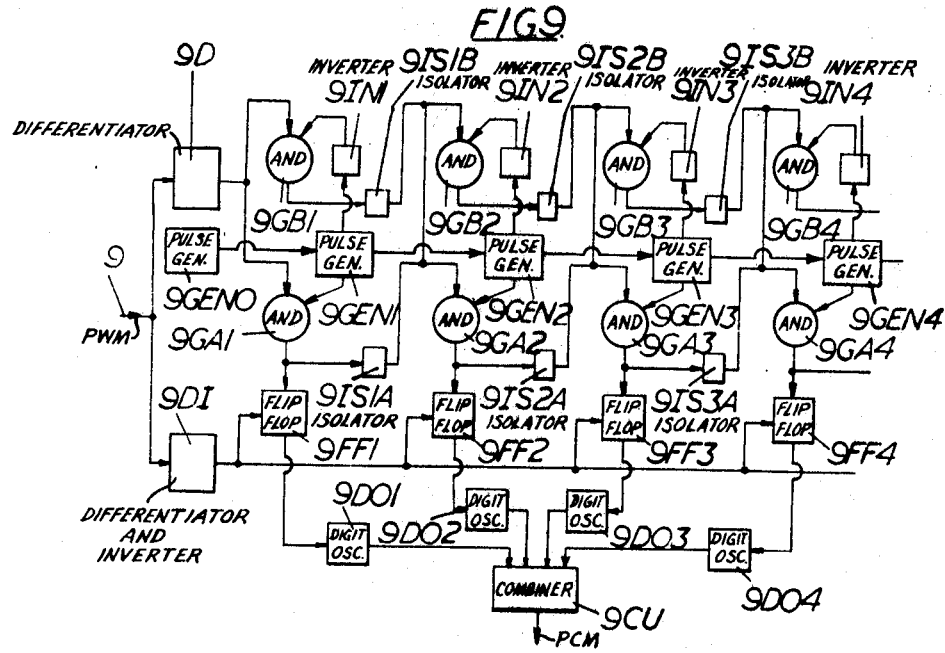
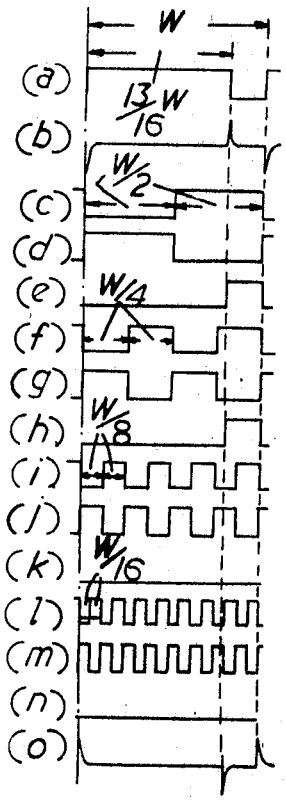
Inventors
GEORGE F. CRAVEN
ANTONI E. KARBOWIAK
By
Attorney Inventors
GEORGE F. CRAVEN
ANTONI E. KARBOWIAK
By
Attorney Inventors
GEORGE F. CRAVEN
ANTONI E. KARBOWIAK
By *Percy P. Carty*
Attorney

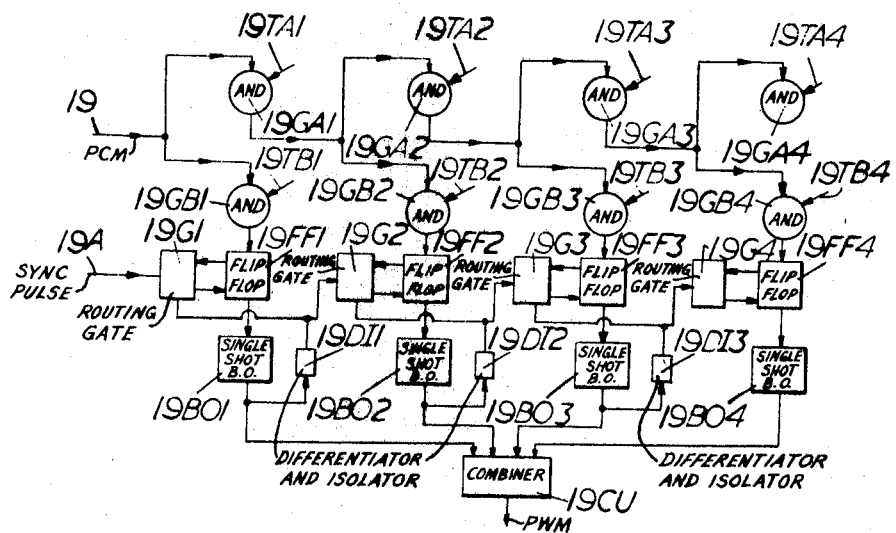
FIG.19
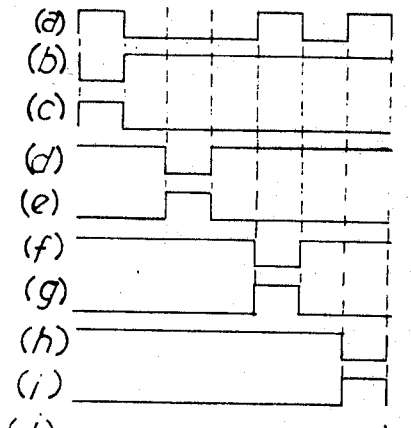
FIG.20.
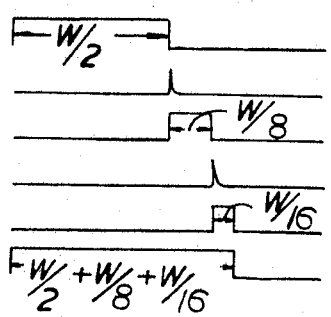

United States Patent Office 3,500,387
Patented Mar. 10, 1970

3,500,387
PTM TO PCM AND PCM TO PTM CONVERSION CIRCUITRY
George Frederick Craven and Antoni Emil Karbowiak, London, England, assignors to International Standard Electric Corporation, New York, N.Y., a corporation of Delaware
Filed Dec. 7, 1964, Ser. No. 416,459
Claims priority, application Great Britain, Dec. 10, 1963, 48,771/63
Int. Cl. H04l 3/00; G08c 9/00, 11/00
U.S. Cl. 340—347
10 Claims

ABSTRACT OF THE DISCLOSURE

Several embodiments of a coder and decoder are described operating on time quantization (PTM to PCM and the reverse) rather than amplitude quantization. In the coder, N stages, to generate an N digit PCM signal, each include a coincidence gate, timed in successive stages by timing signals of decreasing powers of two, and delay arrangements having decreasing delays of powers of two. The coincidence gates of the stages respond to its appropriate fraction of the PTM input signal to produce the PCM signal by activating a pulse generator in each stage, whose outputs are coupled to a common combiner. In the decoders, N stages each include a coincidence gate responding to a different one of the code elements of the PCM signal, timed by decreasing powers of two, and delay elements of appropriately decreasing powers of two to produce an appropriate portion of the PTM signal from which the total PTM signal is generated.

---

This invention relates to electrical circuits for digital communication systems.

An outstanding problem in digital communication systems is the provision of an accurate analog to digital converter. The normal practice is to apply the input information in the form of a band-limited amplitude modulated wave to a staircase transducer which effectively performs the function of an amplitude quantizer.

The output from the quantizer is then sampled at a rate equal to twice the information bandwidth or higher. Subsequently the quantized pulse amplitude modulated (PAM) wave is converted in a suitable coder into a convenient pulse code modulated (PCM) code, which after a serializing operation is transmitted along the communication line.

The serialized PCM information contains the original information, but only to a certain probability given by the errors introduced in the quantizing equipment. This error waveform is specified by the quantization noise, which to a large extent can be eliminated by filtering. A proportion of this noise, however, falls in the original information bandwidth and cannot be removed.

The magnitude of the quantization noise is related to the number of amplitude quantization steps chosen. The quantization noise in db is roughly expressed by the relation $S/N_q = 20 \log n + 3$ db, where $n$ is the number of steps in the peak to peak signal.

For a wideband operation, such as multichannel telephony, this noise must be kept to a level better than $-50$ db, implying a minimum number of quantization steps of the order of 500.

Amplitude quantization beyond about 100 steps become increasingly difficult, both on economic and technological grounds.

According to the aspect of the invention, there is provided signal translating equipment for deriving a pulse code modulated signal indicative of an applied pulse time modulated signal, in which the pulse time modulated signal is applied to a plurality of signal transmission paths equal in number to the number of elements in the code in which each of said transmission paths is rendered available for a different fraction of a predetermined total time period for the transmission therethrough of said applied signal or a fraction of said applied signal corresponding to the fraction of the respective transmission path, and in which the pulse code modulated signal is derived according to which of the transmission paths the applied signal or fraction thereof is transmitted through.

According to another aspect of the invention there is provided signal translating equipment for deriving a pulse time modulated signal indicative of an applied pulse code modulated signal, in which the pulse code modulated signal is applied to a plurality of signal transmission paths equal in number to the number of elements in the code, in which each of said transmission paths is rendered available for a different portion of a predetermined total time period for the transmission therethrough of a digit of said applied signal corresponding to the portion of the respective transmission path, and in which the pulse time modulated signal is derived according to which of the transmission paths a digit of the applied signal is transmitted through.

The invention will be described with reference to the accompanying drawings, in which:

FIG. 2 is a functional block diagram of one form of the coder in the system;

FIG. 3 shows waveforms at selected points in FIG. 2;

FIG. 9 is a functional block diagram of yet another form of the coder in the system;

FIG. 10 shows waveforms at selected points in FIG. 9;

FIG. 19 is a functional block diagram of yet another form of the decoder in the system; and FIG. 20 shows waveforms at selected points in FIG. 19.

Figure 1:
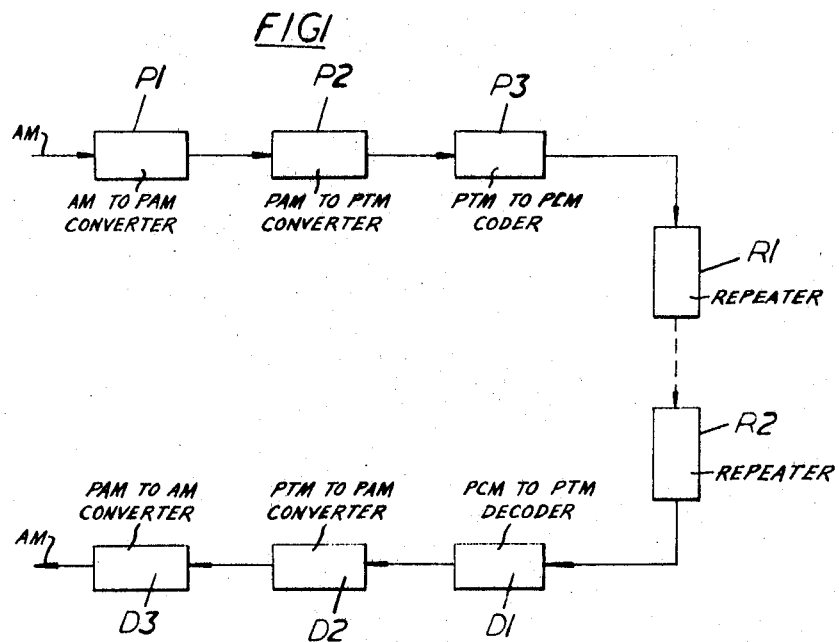
FIG. 1 is a block schematic diagram of a digital communication system embodying the invention.

Referring to FIG. 1, a signal represented by an amplitude modulated (AM) wave is sampled (period T), converted to a PAM signal in known manner at P1, converted to a pulse width modulated (PWM) or pulse position modulated (PPM) signal in known manner at P2, and then converted to a PCM signal at P3. P3 may take various forms, to be described later.

The PCM signal passes via a required number of conventional regenerative repeaters, such as repeaters R1, R2, to a decoder D1 whose function is to recover in the PPM or PWM form the information contained in the PCM signal. D1 may take various forms, to be described later. The PPM or PWM signal is converted at D2 in known manner to a PAM signal, and finally at D3 the original amplitude modulated signal is obtained in known manner.

It should be noted that pulse width modulation and pulse position modulation are both forms of pulse time modulation (PTM).

In all forms of coder to be described, the function is to perform time quantization on a PWM or PPM signal presented thereto and to deliver a PCM output. Derivation of the digital PCM signal is automatic and it will be assumed that the output required is in simple binary form. Presentation of the PWM or PPM signal may be in series form or in parallel form. Similarly for the various forms of decoder to be described, a PCM signal based on the simple binary form will be assumed, with presentation of the PCM signal in series or in parallel form, with the decoder output being in the form of a PWM or PPM signal.

FIG. 2 shows a form of the coder in which the signal is presented thereto at input 2 in PWM form to a series of cascaded stages. The coder comprises a number of stages, one stage per digit of the PCM signal. Each stage includes a delay element, such as 2DL1, 2DL2 etc., a coincidence gate, such as 2GA1, 2GA2 etc., having one input thereto energized by an appropriate portion of the applied PWM signal, and the other input energized as a trigger input by a square wave pulse generator, such as 2GEN1 and 2GEN2 etc. The output from each gate 2GA is applied to a digit oscillator, such as 2DO1, 2DO2 etc., and also via an isolating stage, such as 2IS1, 2IS2 etc., to the input of the next stage and to an inhibiting input to a gate, such as 2GB1, 2GB2 etc., the input to which is derived from the output of the associated delay element 2DL. Outputs from the digit oscillators 2DO are combined in a combining unit 2CU, the output of which is the PCM signal.

With a sampling frequency of $1/T$, successive gates 2GA1, 2GA2 etc., are triggered utilizing continuous pulse waves (CW) of frequencies $2/T, 4/T \ldots 2N/T$ (locked to $1/T$ frequency from generator 2GEN0), where N is the number of digits required in the PCM signal.

Successive delay elements 2DL1, 2DL2 etc., have delay times of $T/2, T/4 \ldots T/2N$. The gates 2GB1, 2GB2 etc., are open to pass an input applied thereto from the associated delay element 2DL in the absence of an inhibiting input from the output of the respective gate 2GA, and are closed when the respective gate 2GA produces an output.

Time quantization and coding is performed in the following general manner. If the pulse width of the applied PWM signal is more than $\frac{1}{2}T$, then digit 1 of the PCM signal is registered by output from gate 2GA1, and gate 2GB1 is closed. The output from 2GA1 is applied to the input of the second stage, and if the original pulse width was more than $\frac{3}{4}T$ then digit 2 is registered by output from gate 2GA2, and so on.

If, on the other hand, the width of the input pulse is less than $\frac{1}{2}T$, digit 1 is registered as zero, gate 2GB1 is open and the output from delay element 2DL1 is presented to the second stage. The output from gate 2GA2 then registers digit 2 and closes gate 2GB2 if the original pulse width was more than $\frac{1}{4}T$, otherwise zero is registered and gate 2GB2 is open, and so on.

Clearly, suitable delays must be inserted into the digits $2, 3 \ldots N$ to place them in the proper time positions to constitute the PCM signal output from the coder.

FIG. 3 shows the various waveforms present at different points in FIG. 2, in the time quantization and coding of a PWM signal of pulse width 13/16W (FIG. 3a), where W is the maximum possible width of the signal in the sampling period T.

Gate 2GA1 is closed for the first half of the sampling period, and open for the remainder of the period (FIG. 3b) under control of the triggering generator 2GEN1. Accordingly, a pulse of width 5/16W (FIG. 3c) passes through the gate 2GA1 to be delivered as an output to energize the digit one oscillator 2DO1, the output also passing via the isolating stage 2IS1 to inhibit or close gate 2GB1 to the input applied thereto from the delay element 2DL1 after a delay of $T/2$ ($W/2$), this input being the original PWM signal delayed by $T/2$ (FIG. 3d).

The input applied to the second stage is therefore a pulse of width 5/16W, the leading edge of this pulse occurring at time $T/2$ with respect to the start of the sampling period (FIG. 3e).

Gate 2GA2 is triggered throughout the sampling period by generator 2GEN2 so as to be closed for the first W/4 of the period, opened during the next W/4 period, closed for the third W/4 period, and open again during the final W/4 period (FIG. 3f). Accordingly, a portion of the input applied thereto from the previous stage passes through the gate 2GA2, this portion starting with its leading edge at 12W/16 from the commencement of the sampling period and persisting for W/16 (FIG. 3g). This output from gate 2GA2 energizes the digit two oscillator 2DO2, and is also applied via the isolating stage 2IS2 to the input of the third stage. The output from the second stage consisting of the output from the first stage delayed by the delay element 2DL2 by $T/4$ ($W/4$) FIG. 3h) is blocked by gate 2GB2. The input to the third stage is shown in FIG. 3i. Gate 2GA3 is alternately closed and opened under control of generator 2GEN3 for periods $T/8$ ($W/8$) (FIG. 3j) and closed when the input from the second stage is applied thereto. Accordingly there is no output from gate 2GA3 (FIG. 3k) so that the third digit is registered as zero, gate 2GB3 is opened, and the input to the third stage from gate 2GA2, delayed by the delay element 2DL3 for a period $T/8$ ($W/8$), is applied to the fourth stage (FIG. 3l).

Gate 2GA4 is alternately closed and opened under control of generator 2GN4 for periods $T/16$ ($W/16$) (FIG. 3m) and is closed when the input from the third stage is applied thereto. Accordingly the fourth digit is registered as zero.

It will be seen, therefore, that for a PWM signal of 13/16W, the coder has produced a PCM signal of 1100 which is the simple binary digital equivalent of the original signal. By suitable rearrangement, any desired code can be produced.

All the elements of the coder can be passive elements, except for the production of the continuous waveforms for triggering the gates 2GA which could be derived from a single multivibrator locked to the sampling frequency.

Figure 4:
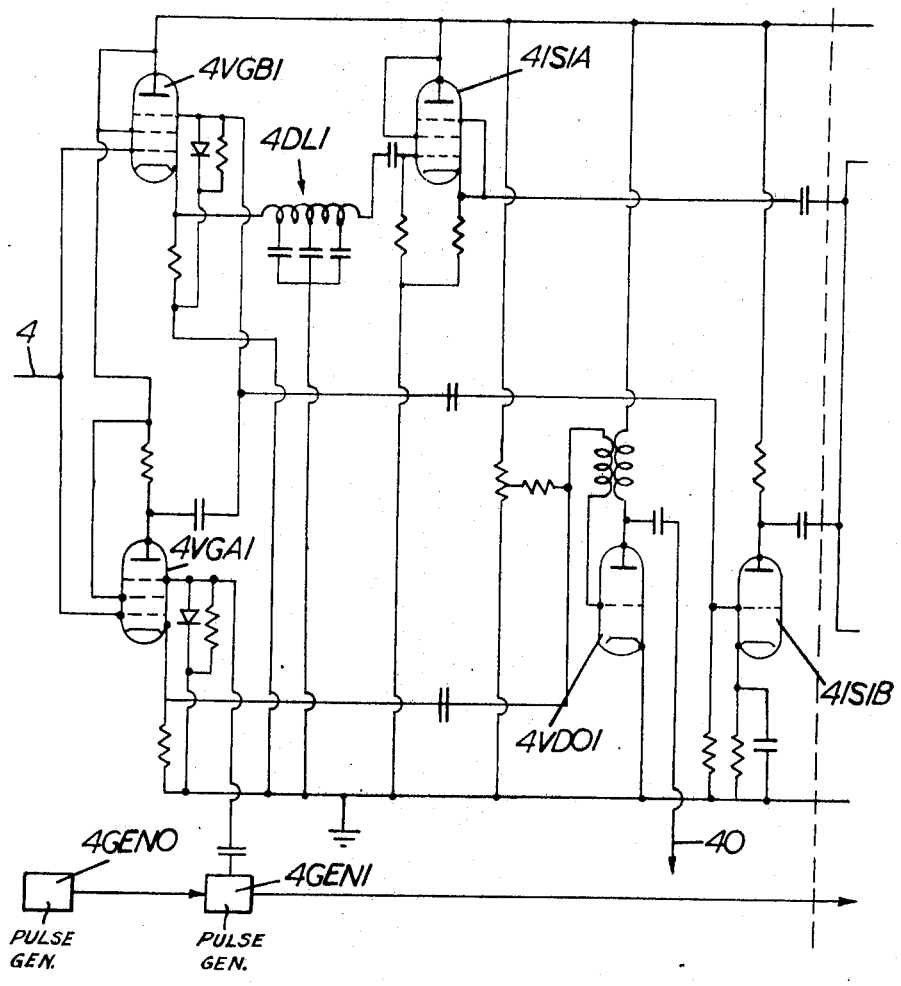
FIG. 4 is a circuit diagram of the coder of FIG. 2 utilizing tubes.

FIG. 4 shows a circuit arrangement of the first stage of the coder of FIG. 2 using tubes as active element. Clearly transistors could be used instead of tubes. Alternately, suitable arrangements of diodes could be used.

In FIG. 4, tube 4VGA1 corresponds to the coincidence gate 2GA1 of FIG. 2, tube 4VGB1 to the gate 2GB1 of FIG. 2. The delay element 2DL1 of FIG. 2 is delay line 4DL1 in FIG. 4. Input of the PWM signal to the first stage is at 4. Generators 4GEN0 and 4GEN1 in FIG. 4 correspond to 2GEN0 and 2GEN1 in FIG. 2. Tube 4VDO1 is the digit oscillator 2DO1 of FIG. 2. Tubes 4IS1A and 5IS1B correspond to the isolating stage 2IS1 of FIG. 2. The first stage digit output is obtained at 40 from the digit oscillator 4VDO1. Operation is as described for the coder of FIG. 2.

For applications utilizing nano-second or sub-nano-second pulses, baseband pulses cannot be used and carrier techniques must be employed. For such applications, pulsed microwaves can be used in conjunction with a suitable arrangement of hybrids as indicated schematically in FIG. 5.

Figure 5:
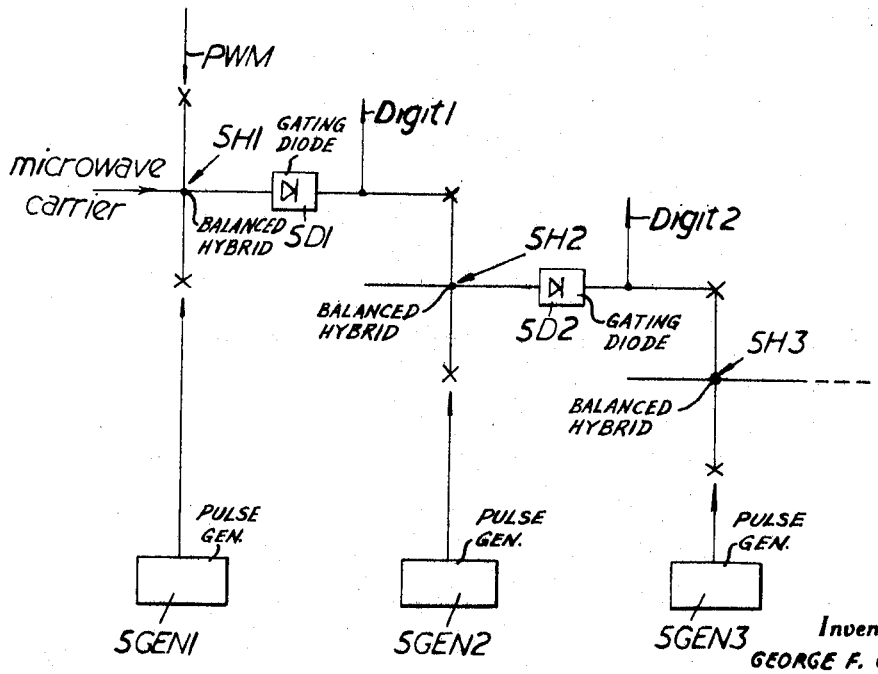
FIG. 5 is a circuit diagram of the coder of FIG. 2 utilizing microwave components.

This shows a number of balanced hybrids 5H1, 5H2 etc. with gating diodes 5D1, 5D2, etc., arranged in the decoupled arms. Successive diodes 5D are modulated by the rectified output from the preceding hybrid, and the chain can be extended as required. In FIG. 5 there is only a chain of balanced hybrids corresponding to the gates 2GA of FIG. 2. A similar chain of balanced hybrids is necessary to correspond to the gates 2GB of FIG. 2 with interconnections therebetween as indicated functionally in FIG. 2, and not shown in FIG. 5.

In the coder of FIG. 2, the PWM signal is coded into PCM by a number of decreasing pulse width gates connected in cascade. Each gate, in effect, decides whether the pulse width exceeds or is less than a given fraction and a corresponding mark or space is recorded. The subtraction process is continued until the smallest pulse width corresponding to the last digit is obtained.

Figure 6:
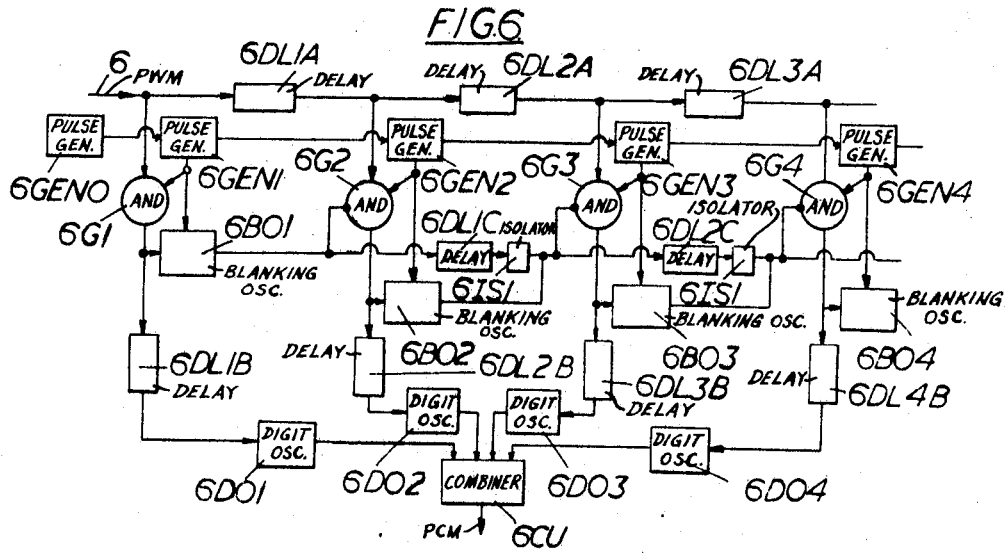
FIG. 6 is a functional block diagram of another form of the coder in the system.

FIG. 6 illustrated the form of coder in which the PWM/PCM coding is obtained by the parallel connection of pulse width gates. The PWM signal is applied at input 6, effectively in parallel, to a number of pulse width AND gates, such as 6G1, 6G2 etc., one gate per stage, which are operated by square waves W/2, W/4, W/8 etc., from generators 6GEN1, 6GEN2 etc., with the stages being interconnected via delay elements 6DL1A, 6DL2A etc., having delays of W/2, W/4, W/8 etc., respectively. So far this is similar to the coder of FIG. 2. However, with parallel connected gates this is not sufficient to provide unique information encoding the PWM signal. For instance, a long PWM signal applied to a small fraction gate will provide an output at every cycle of the square wave when both signals turn the gate on. A remedy for this is to derive a blanking pulse from the largest fraction pulse gate open, which renders all other gates inoperative for a period equal to the pulse width of the gate open.

This is done by blanking oscillators 6BO1, 6BO2 etc., each arranged to be started by an output from the gate 6G in the same stage, the output of each blanking oscillator 6BO, apart from 6BO1, being connected to all succeeding gates 6G in the coder via suitable delay elements 6DL1, 6DL2, and isolating stages 6IS1, 6IS2 etc., with the blanking oscillator outputs inhibiting or closing the gates 6G to which they are connected. Delay elements 6DL1C etc., have delays of W/4, W/8, W/16 respectively. Each blanking oscillator 6BO is switched off under control of the respective generator 6GEN after delivering a single blanking pulse of appropriate width.

The remainder of the coder circuit comprises suitable delay elements 6DL1B, 6DL2B etc., for placing the digit outputs in the correct time position in the PCM output, the delays being W/16, W/32, W/64, etc., respectively, digit oscillators 6DO1, 6DO2 etc., and combining unit 6CU.

Assuming a PWM signal of 13/16W (FIG. 7a) applied to the coder, gate 6G1 is closed for W/2 and open for W/2 under control of the generator 6GEN1 (FIG. 7b). Accordingly, after a period of W/2 6G1 delivers an output of a pulse of width 5/16W (FIG. 7c). The first digit is registered as a one, because there is an output from 6G1.

The original PWM signal, delayed by W/2 by delay element 6DL1A is now applied to the second stage (FIG. 7d). The output from 6G1 also triggers the blanking oscillator 6BO1 which generates a pulse of width W/2 (FIG. 7e). Applied to all other gates 6G2, etc., this will prevent them opening during the period W/2. With regard to the second stage, the blanking pulse from 6BO1 is applied with no delay to inhibit 6G2 for a period of W/2. 6G2 is alternately closed and opened for periods W/4 under control of generator 6GEN2 (FIG. 7f) but is closed by the blanking pulse from 6BO1 for the first half of the period W. Accordingly 6G2 only delivers an output after 12/16W from the commencement of the period in which the second stage is effective, this output persists for W/16 (FIG. 7g). The second digit is registered as a one.

The original PWM signal is applied to the third stage after a further delay of W/4 by delay element 6DL2A (FIG. 7h). A further blanking pulse from the blanking oscillator 6BO2 is produced because 6G2 delivers an output to trigger 6BO2. Therefore, gate 6G3 receives an inhibiting input (FIG. 7j) for a period W/2, from the blanking oscillator 6BO1 delayed by 6DL1C to commence at W/2+W/4, i.e., in coincidence with the start of the PWM signal as applied to the third stage, and another inhibiting input (FIG. 7i) from blanking oscillator 6BO2 which is effective for a period of W/4 and commencing at the ending of the inhibiting input from 6BO1. Therefore, although gate 6G3 is alternately closed and open under control of generator 6GEN3 for periods W/8 (FIG. 7k), the gate 6G3 is closed for the whole period 13/16W of the PWM signal. There is no output from 6G3 (FIG. 7l) and the third digit is registered as zero.

The original PWM signal, further delayed by W/8 by delay element 3DL3A, is applied to the fourth stage (FIG. 7m). On the gate 6G4 there is an inhibiting input (FIG. 7o) from 6BO1 further delayed by W/8 by delay element 6DL2C to start in coincidence with the start of the PWM signal applied to the fourth stage, and a further inhibiting input (FIG. 7n) from 6BO2 delayed by W/8 by delay element 6DL2C to be effective for W/4 after the ending of the first inhibiting input from 6BO1. Generator 6GEN4 triggers gate 6G4 to be alternately closed and opened for periods of W/16 (FIG. 7p). Gate 6G4 is closed for the whole period of the applied PWM signal of 13/16W, and there is no output therefrom. The fourth digit is registered as zero.

Figure 7:
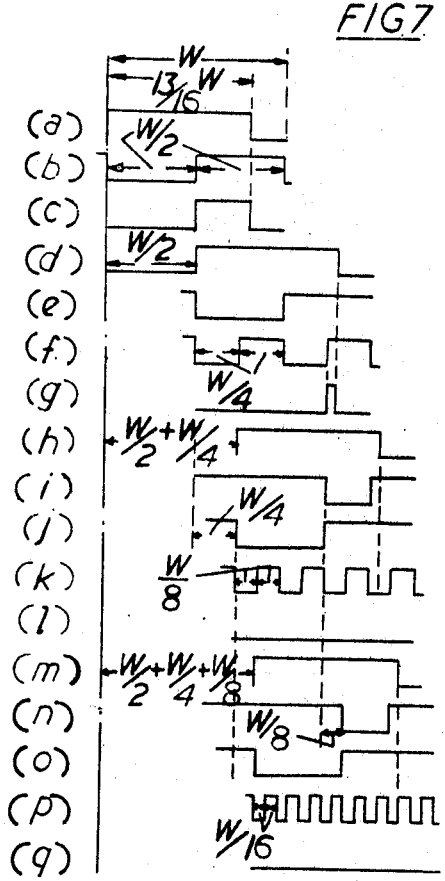
FIG. 7 shows waveforms at selected points in FIG. 6.

Hence the coder in FIG. 7 produces a PCM signal of 1100 for a PWM signal of 13/16W by time quantization.

Figure 8:
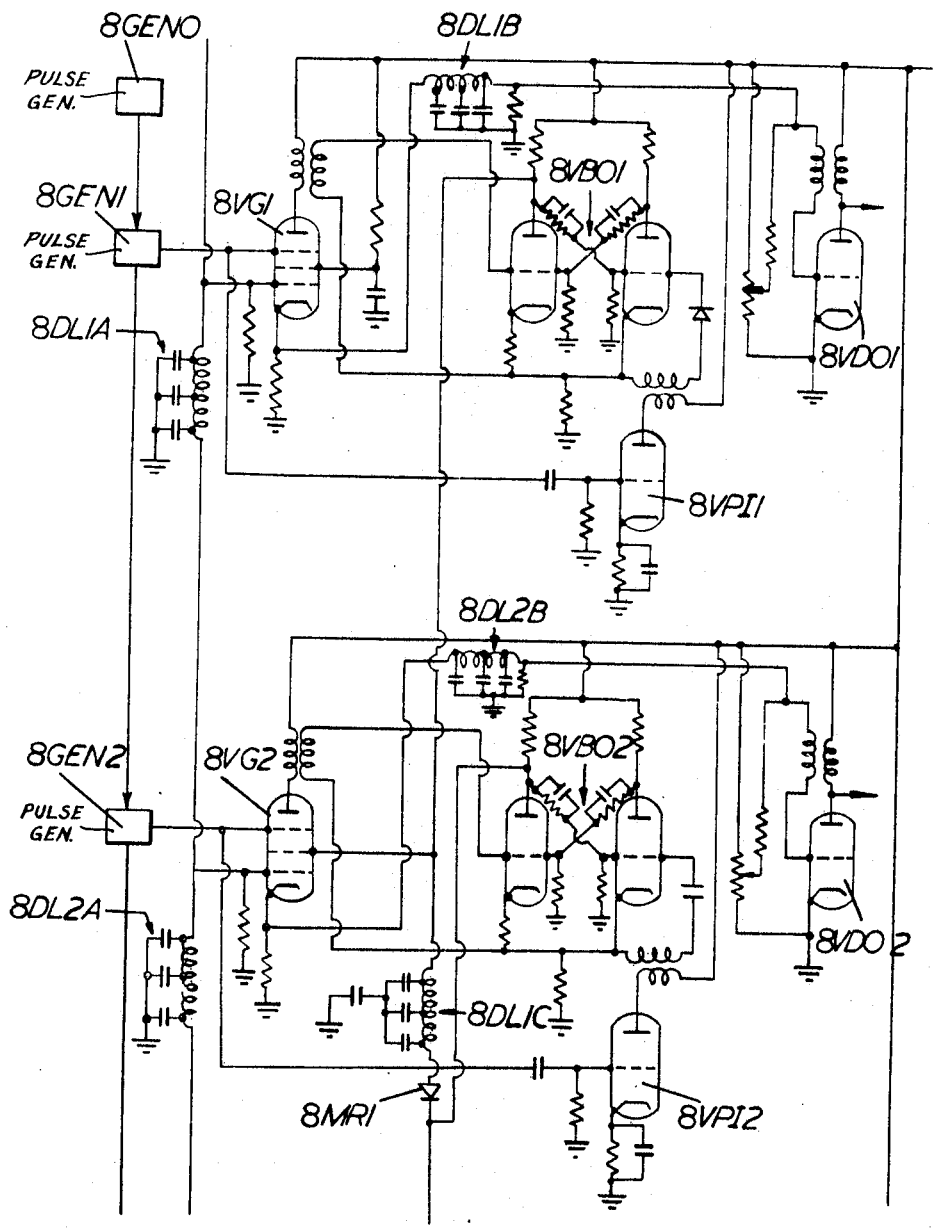
FIG. 8 is a circuit diagram of the coder of FIG. 6 utilizing tubes.

FIG. 8 shows a circuit arrangement of the first two stages of the coder shown in FIG. 6, using tubes. Generators 8GEN0, 8GEN1 and 8GEN2 correspond respectively to 6GEN0, 6GEN1 and 6GEN2 in FIG. 6. Tube 8VG1 and 8VG2 correspond respectively to the AND gates 6G1 and 6G2 in FIG. 6. Delay elements 6DL1A, 6DL1B and 6DL2A, 6DL2B are respectively, the delay lines 8DL1A, 8DL1B and 8DL2A, and 8DL2B in FIG. 8. The blanking oscillators 6BO1 and 6BO2 of FIG. 6 are respectively, the two-tube flip-flop devices 8VBO1 and 8VBO2 in FIG. 8. Tubes 8VDO1 and 8VDO2 in FIG. 8 correspond to the digit oscilaltors 6DO1 and 6DO2 in FIG. 6. There are tubes 8VPI1 and 8VPI2 functioning as phase inverters in the reset circuit of the blanking oscillators 8VBO. Rectifier 8MR1 in FIG. 8 corresponds to the isolating stage 6IS1 in FIG. 6. Operation is as described for the coder in FIG. 6.

In the coder shown in FIG. 9, each stage comprises a first coincidence gate, such as 9GA1, 9GA2 etc., and a second coincidence gate such as 9GB1, 9GB2 etc. Gates 9GA are triggered with continuous waves of frequencies $T/2$, $T/4$ ... by respective generators 9GEN1, 9GEN2 etc., and the gates 9GB are also triggered by the respective generators at the same frequencies 180° out of phase with the gates 9GA. Inverters, such as 9IN1, 9IN2 etc., are shown to indicate this phase inversion. The generators 9GEN1 etc., are locked to the sampling frequency T of generator 9GEN0. Isolating stages such as 9IS1B, 9IS2B etc., and 9IS1A, 9IS2A etc., are provided to prevent feedback between stages.

The output of each gate 9GA is connetced to a flip-flop, such as 9FF1, 9FF2 in the same stage. The flip-flops delivering an output when the associated gate 9GA delivers an output, and are reset by the output from a differentiator and inverter 9D1. The outputs of the flip-flops 9FF are each connected via a digit oscillator, such as 9DO1, 9DO2 etc., to a combining unit 9CU.

The coder shown in FIG. 9 operates in a series fashion, with a PWM signal being applied to the gates 9GB via input 9 and differentiator 9D.

The pulse from differentiator 9D defining the leading edge of the PWM signal is used for synchronizing the gating waveforms and the outgoing digital information. The pulse from differentiator 9D defining the end or trailing edge of the PWM signal (the PPM information) is the one acted upon in determining the PCM coding.

Considering a PWM signal of 13/16W (FIG. 10a) applied to the differentiator 9D, the output of the differentiator 9D is a PPM signal as shown in FIG. 10b. This is applied simultaneously to both gate 9GA1 and gate 9GB1. Gate 9GA1 is closed for the first W/2 period and open for the second W/2 period (FIG. 10c) while 9GB1 is open for the first W/2 period and closed for the second W/2 period (FIG. 10d). Therefore, the differentiated trailing edge of the signal passes through gate 9GA1, and gate 9GA1 delivers a short output pulse to energize the flip-flop 9FF1 at the instant 13/16W and the flip-flop 9FF1 delivers an output pulse persisting till the end of the period (FIG. 10e) when it is reset by the differentiated leading edge of the next PPM signal in the following sampling period. An output from the flip-flop 9FF1 when it is reset causes the first digit to be registered as one.

The output from gate 9GA1, which is the PPM information, is applied to both gates 9GA2 and 9GB2 in the second stage, which are triggered as shown respectively, in FIG. 10f and FIG. 10g at frequencies of W/4, but 180° out of phase. It will be apparent that gate 9GA2 is open when the PPM information pulse is applied thereto, and so flip-flop 9FF2 is energized and reset (FIG. 10h) in a similar manner to 9FF1, so that the second digit is registered as one.

In like manner, the PPM information pulse is applied to gates 9GA3 and 9GB3 triggered as shown in FIG. 10i and FIG. 10j respectively, at frequencies of W/8, but 180° out of phase. In this case gate 9GB3 is open and 9GA3 is closed. The flip-flop 9FF3 is not energized (FIG. 10k) and the third digit is registered as zero.

The PPM information pulse is applied via the output from gate 9GB3 to the gates 9GA4 and 9GB4 of the fourth stage, triggered 180° out of phase with each other at a frequency of W/16, as shown in FIG. 10l and FIG. 10m. As in the third stage gate 9GA4 is open and gate 9GB4 is closed, there is no energization of the flip-flop 9FF4 (FIG. 10n) and the fourth digit is registered as zero.

The PCM signal is therefore 1100. FIG. 10o indicates the output from the differentiator and inverter 9DI to reset the flip-flops 9FF.

Figure 11:
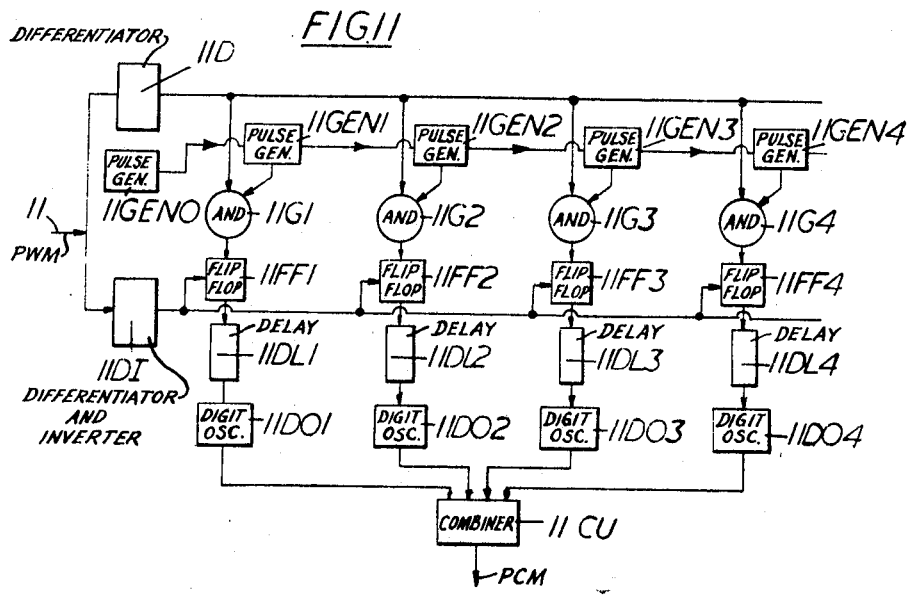
FIG. 11 is a functional block diagram of still another form of the coder in the system.

In the coder shown in FIG. 11, the PPM signal is applied in parallel fashion, and a distinct advantage in simplicity of circuitry and economy of components is effected. The essential components are a differentiator 11D to convert PWM to PPM, coincidence gates, such as 11G1, 11G2 etc., one for each digit, flip-flops, such as 11FF1, 11FF2 etc., one for each digit, and generators, such as 11GEN1, 11GEN2 etc., locked to generator 11GEN0 running at sampling frequency, for each digit, with the generators 11GEN1, 11GEN2 etc., triggering their respective gates 11G at frequencies of T/2, T/4 etc. There is also a differentiator inverter 11DI to reset any energized flip-flops 11FF, plus delay elements, such as 11DL1, 11DL2 etc., with delays of zero, W/2, W/4 etc., connected via digit oscillators, such as 11DO1, 11DO2 etc., to a combining unit 11CU.

With a PWM signal of 13/16W (FIG. 12a) applied to the differentiator 11D by input 11, a PPM signal is obtained (FIG. 12b), and the trailing edge containing the PPM information is applied simultaneously to all the gates 11G.

Gate 11G1 is closed for the first W/2 period and open for the second W/2 period (FIG. 12c), therefore, the flip-flop 11FF1 is energized and delivers an output for the rest of the period (FIG. 12d) and the first digit is registered as one when the resetting pulse is applied.

Figure 12:
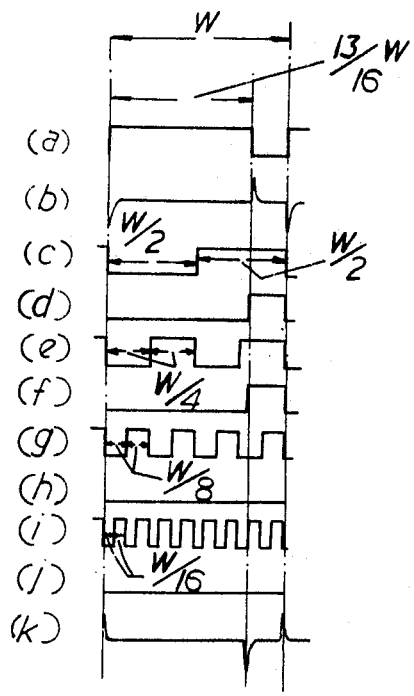
FIG. 12 shows waveforms at selected points in FIG. 11.

Gate 11G2 is closed and opened at a rate of W/4 (FIG. 12e) and is open at the instant of the PPM information signal, so flip-flop 11FF2 is energized to deliver an output till the end of the sampling period (FIG. 12f). The second digit is therefore registered as a one.

Gate 11G3 is closed and opened at a rate of W/8 (FIG. 12g) and is closed at the instant being considered, the time of occurrence of the PPM information signal. Flip-flop 11FF3 is not energized (FIG. 12h) and the third digit is registered as zero.

Similarly with gate 11G4 closing and opening at a rate of W/16 (FIG. 12i). This gate is closed and the flip-flop 11FF4 is not energized (FIG. 12j) at the time of occurrence of the PPM information signal. Thus, the fourth digit is registered as zero. The flip-flops 11FF1 and 11FF2 are reset at the end of the period by the waveform shown in FIG. 12k derived from the differentiator inverter 11DI.

Thus, the PCM output of the coder is 1100. It will be apparent that by combining the outputs of the flip-flops in various ways a variety of codes can be produced.

It should be observed that precision obtainable in equal quantization steps is but one advantage of time quantization. The extreme simplicity of the scheme is another important advantage. There is economy in basic units needed to achieve the coding. Whether a series or a parallel arrangement is used, the number of flip-flops needed is only log $n$ ($n$=number of quantization steps) rather than $n$ which is the number needed with conventional parallel coding, using amplitude quantization.

Another advantage is that it avoids the use of fast counters which are difficult to realise in practice.

The conversion from AM to PWM is a necessary first step in the process, and non-linearity in this step must, clearly, be avoided. High degree of linearity can, however, be achieved by various known techniques of negative feedback.

In many applications there is no need for the highest accuracy, and in such systems use is made of companding, i.e., the conversion law from amplitude to pulse code is non-linear, with a converse non-linearity in the color. A logarithmic law is commonly used.

The copending application Serial No. 453,666, filed May 6, 1965 describes a PAM to PWM converter utilizing the so-called "step recovery diode," which is suitable for conversion at sampling rates in the region of 10–100 mc./s. The step recovery diode can be used in such a way that its time conversion characteristics make use of the non-linear region. In this region the conversion characteristic is exponential, and, thus, this converter could be used to provide companding.

The accuracy of the equipment depends almost entirely on the relative time precision with which the AND gates can be operated and this, clearly, is related to the channel capacity and the number of levels with which the equipment is called upon to deal. Thus, for a 60 channel super group and 512 levels the least significant "bit of time" is 2 nanoseconds. But since absolute times do not matter, the 2 nanoseconds refers to the accuracy with which the harmonics at frequencies T/2, T/4 . . . can be synchronized. The synchronizing information is derived from the leading edge of the PWM information and, since this is periodic, it can be obtained precisely and the synchronization of the CW pulse gating waveforms is, therefore, no problem.

The intelligence is contained in the timing of the trailing edge relative to the leading edge. The relative time precision, here, is, for the above example, 2 nanoseconds. But the last gating waveform suppresses the two adjacent time intervals and, therefore, the accuracy could be relaxed to 6 nanoseconds. Further improvement could be gained by a simple interlocking of the last two gates giving an improvement by a further factor of two, etc.

Furthermore any timing inaccuracy in the trailing edge would, presumably, be in the form of jitter. Such jitter would amount to noise which would tend to smooth out the quantum steps with some beneficial effects.

In the same way as with the coder, the decoder can be in either the parallel or the serial form. In both cases, however, the basic functions performed are the same, and the decoder is in principle a simple device. For decoding a received PCM signal into a PPM form, there is a suitable delay unit comprising a number of delay elements, one per digit of the code, shunted by switches which are operated in accordance with the binary code, i.e., the digit pulses of the PCM signal. The switches are made to open whenever the respective PCM digits are present. Thus, the first digit closes the first switch, the second digit the second switch, each switch remaining closed for the time duration of the period T. If the input to the delay unit is the differentiated leading edge of the first digit of the character (the character synchronizing pulse) then the output pulse will be delayed in accordance with the delay switched in the delay line. Therefore, the output pulse is in the PPM form and equivalent to the PCM code impressed on the switches. The delay unit is a suitable length of delay line for high speed operation, or a locked-in multivibrator and differentiator for slower speeds.

Figure 13:
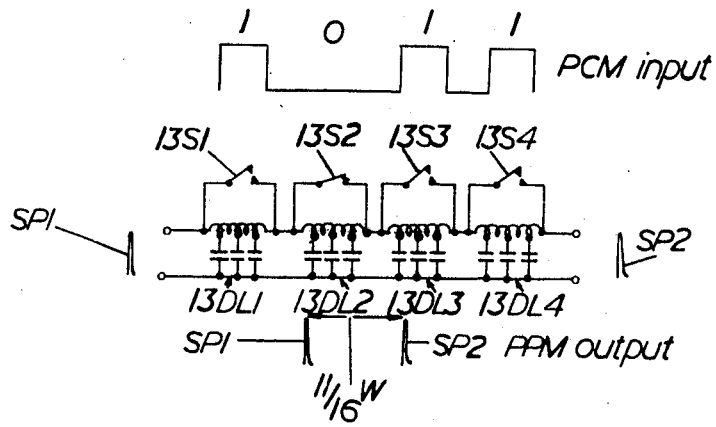
FIG. 13 illustrates the basic operating principles of a form of decoder in the system.

As shown in FIG. 13, the delay line comprises as many elements, such as 13DL1, 13DL2 etc., as there are digits in the code. Delay times of successive delay elements are $W/2$, $W/4$, $W/8$ ... $W/2n$, where $n$ is the number of digits in the character of the PCM code. Each element is shunted by a switch, such as 13S1, 13S2 etc. A PCM signal, such as 1011, indicated above the circuit diagram in FIG. 13, is arranged to cause the switches 13S to be operated as shown. Thus, where the digit is a one the respective switch is open, and where the digit is a zero, the respective switch is closed. Thus, 13S1, 13S3 and 13S4 are open and 13S2 is closed. A short pulse SP1 applied to the input of the delay line and occurring in time at the commencement of a period equivalent to the sampling period, and conveniently derived by differentiating the leading edge of the first occurring digit in the PCM code, is delayed according to the delay elements it has to pass through, i.e., those delay elements not shorted by closed switches 13S, before emerging as an output pulse SP2. In the examples shown, with the PCM signal of 1011, total delay is $W/2+W/8+W/16$, so that the PPM signal from the decoder is as shown below the circuit diagram of FIG. 13, where SP2 is delayed by $11/16W$ from SP1.

To allow for all possible contingencies, the switches need not be opened by the digit pulses for the whole of the period T. It would be sufficient for the first switch to be opened for a brief period sufficient to pass the input pulse, the second switch for a period just longer than $T/2$, the third switch for $\frac{3}{4}T$, the fourth switch for $\frac{7}{8}T$, etc.

Figure 14:
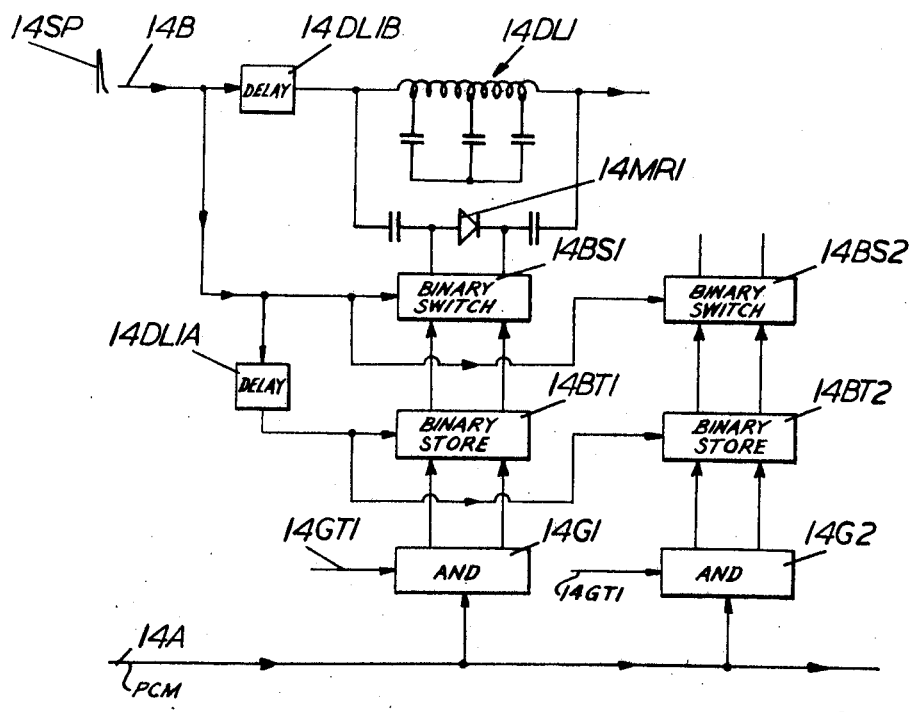
FIG. 14 is a functional block diagram of components associated with one of the elements of the decoder of FIG. 13.

While in FIG. 13 the switches have been shown in elementary manner to explain the principles of the decoder, the required action can be realized in a number of ways, such as, for example, a diode switch, and a typical arrangement is shown in FIG. 14.

In FIG. 14 one delay element 14DL1 is shunted by a diode 14MR1, diode 14MR1 being rendered normally conducting (switch closed) by a binary switch 14BS1 in its reset condition. The PCM signal to be decoded is applied to input 14A to a first digit coincidence gate 14G1 which is triggered via input 14GT1 to be opened during the time period when the first digit of the PCM signal (if it is in the "1" condition) is applied to 14G1. Assuming there is such a "1" digit, 14G1 delivers an output to a binary store 14BT1 to set the store 14BT1 to store the "1" condition. 14BT1 stays in this set condition till the end of the time period of the applied PCM character signal, the remainder of the character digits being stored on successive binary stores 14BT2 etc., in similar manner through appropriately triggered gates 14G2 etc.

At the commencement of the next PCM character signal, a character synchronizing pulse 14SP derived by differentiating the leading edge of the next PCM signal, is applied to input 14B.

The character synchronizing pulse is applied first to the binary switches 14BS to re-set them from their setting from the PCM character signal prior to the one being considered. After passing through a delay unit 14DL1A having a delay less than the time duration of a single PCM digit pulse, the character synchronizing pulse 14SP is applied to the binary stores 14BT to reset them and in so doing deliver an output if they are so reset to cause the digits stored therein to be transferred to the binary switches 14BS. Setting of a binary switch, such as 14BS1, causes the diode 14MR1 to be rendered non-conducting (Switch open).

The character synchronizing pulse 14SP, after passing through a delay unit 14DL1B having a delay slightly greater than that of 14DL1A is applied to the delay element 14DL1 which is now inserted in the path of the pulse 14SP, since diode 14MR1 is non-conducting. Other delay elements are inserted or not according to the condition of their respective diodes, insertion corresponding to a "1" digit, non-insertion corresponding to a "0" digit and the character synchronizing pulse is delayed accordingly.

It will be seen that the delay elements constituting the delay unit are switched in or out before the application of the character synchronizing pulse. This pulse is applied to the delay unit then comprising completely passive elements and there is no possibility of any error arising.

Figure 15:
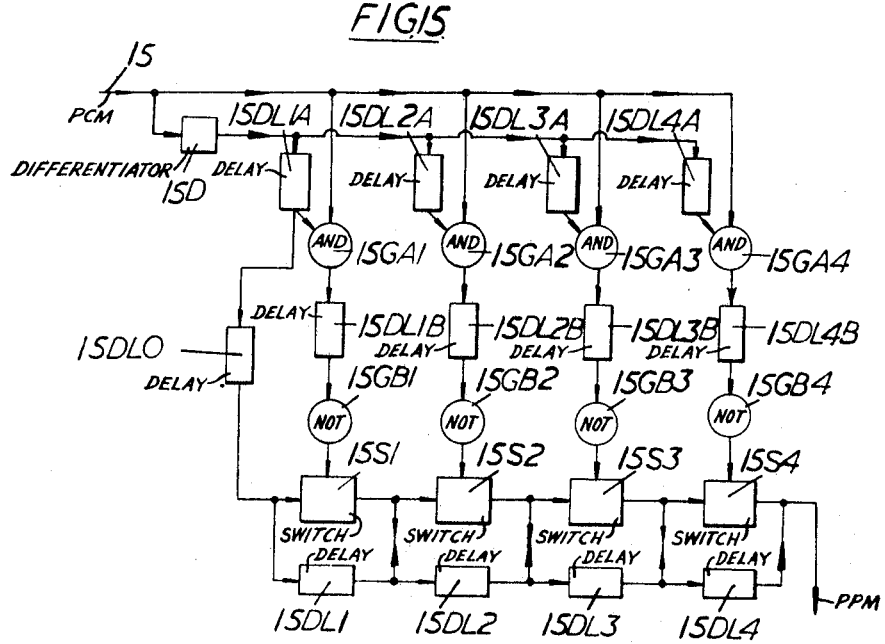
FIG. 15 is a functional block diagram of one form of the decoder in the system.

In the decoder shown in FIG. 15 which produces a PPM output, the PCM signal to be decoded is applied via input 15 in a series-parallel arrangement to coincidence gates 15GA1, 15GA2 etc., there being one gate 15GA per stage with as many stages as there are digits in the PCM code.

The leading edge of the first digit occurring in the PCM signal is differential by differentiator 15D to produce a character synchronizing pulse. This synchronizing pulse passes through delay units 15DL1A, 15DL2A etc., having successively increasing delay times of $W/8$, $W/8+W/4$, $W/8+W/2$, $W/8+3/4W$ etc., respectively, and then to the gates 15GA. Also applied to the gates 15GA is the PCM signal, and the delays successively impressed on the synchronizing pulse from the differentiator 15D are so arranged that at each successive stage there is present on the two inputs of the corresponding gate 15GA, a short synchronizing pulse occurring substantially at the middle of the PCM digit pulse in the "1" condition (if there is one appropriate to that stage).

Each gate 15GA is, therefore, opened to permit a synchronizing pulse to pass therethrough (if there is a PCM digit present in the "1" condition when the synchronizing pulse is applied to the input of the particular gate 15GA. Thus, the gate 15GA1 delivers an output at substantially the middle of the occurrence of the first digit in the code, the gate 15GA2 delivers an output at substantially the middle of the occurrence of the second digit of the code, and so on.

Accordingly synchronizing pulses equivalent to the digits of the code pass through the respective gates 15GA, and are delayed by delay units 15DL1B, 15DL2B, etc., having successfully decreasing delays of $3/4W$, $1/2W$, $1/4W$, 0 (for a four digit code), with the result that all the pulse outputs from the gates 15GA appear not at gates 15GB1, 15GB2 etc., at the same instant, which is substantially at the middle of the final digit position of the PCM code.

The synchronizing pulse further passes through a delay unit 15DLO having a delay time equal to that necessary to delay the synchronizing pulse until substantially the middle of the occurrence of the last digit position of the PCM code ($W/8+3/4W$, in the present example), and this delayed synchronizing pulse, constituting the first of the two pulses of the PPM information signal is applied to the delay unit comprising delay elements 15DL1, 15DL2 etc. shunted by switches 15S1, 15S2 etc. The PCM code having been, as it were, put up on the switches 15S as described with reference to FIG. 13, the synchronizing pulse is delayed according to which of the delay elements 15DL (having delays of W/2, W/4, W/8 and W/16, respectively) are not shunted by the switches 15S, the output pulse from the delay unit being the second pulse of the PPM output.

Considering a PCM signal of 1011 (FIG. 16a) applied to the decoder input 15, a synchronizing pulse from the differentiator 15D is delayed by delay unit 15DL1A for W/8 so as to be applied to one input of gate 15GA1 in coincidence with the first digit of the PCM signal (FIG. 16b), which also represents the output from gate 15GA1. There is no output from gate 15GA2 (FIG. 16c) because although there is applied to one input of gate 15GA2 the synchronizing pulse delayed by delay unit 15DL2A for W/8+W/4 (as indicated in dashed outline in FIG. 16c) there is no digit pulse present on the other input to the gate 15GA2.

The synchronizing pulse is applied to one input of gate 15GA3 after a further delay by 15DL3A of W/8+W/2 (FIG. 16d), and gate 15GA3 delivers an output pulse because of the coincidence of the synchronizing pulse and the third position digit pulse.

Figure 16:
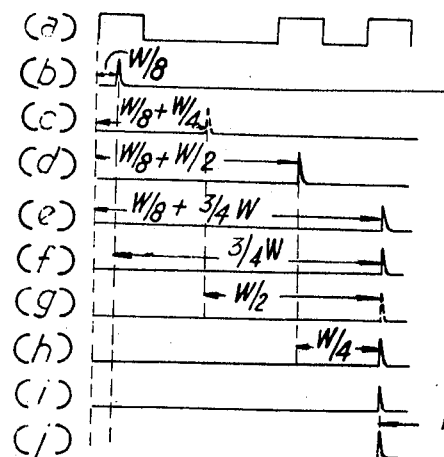
FIG. 16 shows waveforms at selected points in FIG. 15.

Similarly gate 15GA4 delivers an output pulse because of the coincidence of the synchronizing pulse delayed by 15DL4 by W/8+3/4W, and fourth position digit pulse (FIG. 16e).

The output pulse from gate 15GA1 is delayed by 15DL1B for 3/4W (FIG. 16f). If there has been an output pulse from gate 15GA2 it would have been delayed by 15DL2B for W/2 (as indicated in dashed outline in FIG. 16g), but in the present example there is no output from gate 15GA2. The output pulse from gate 15GA3 is delayed by 15DL3B for W/4 (FIG. 16h). There is zero delay by 15DL4B on the output pulse from gate 15GA4 (FIG. 16i). It will be seen that the effect of these different delays is to bring the output pulses into time coincidence on the gates 15GB. The switches 15S are set up according to the impressed pulses, and the synchronizing pulse, after a delay by 15DL1A of W/8 and by 15DL0 of 3/4W, applied to the input of the multi-element delay unit 15DL1, 15DL2 etc., as the switches 15S are set up, is delayed by W/2+W/8+W/16 (FIG. 16j), whereby the PPM output is obtained.

Figure 17:
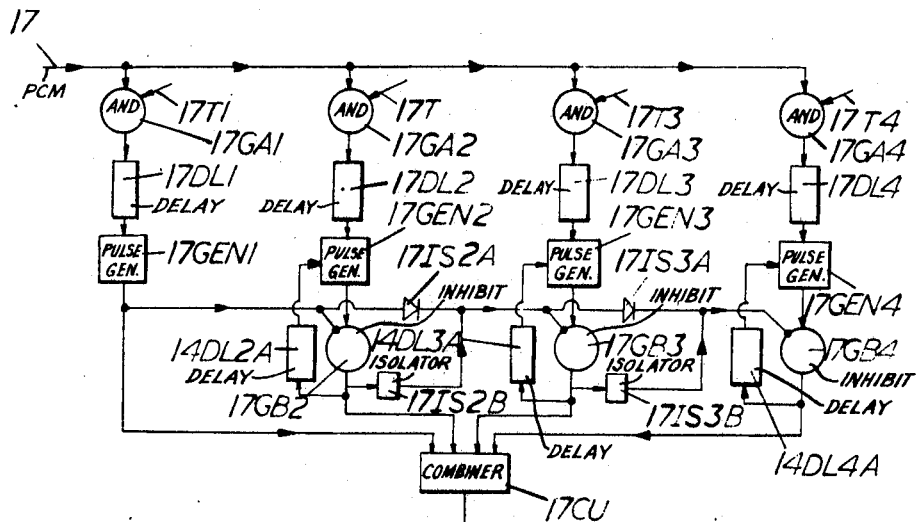
FIG. 17 is a functional block diagram of another form of the decoder in the system.

In the decoder shown in FIG. 17, which provides a PWM output, the PCM input to be decoded is applied via input 17, in a parallel arrangement, to coincidence gates 17GA1, 17GA2, etc., there being one gate 17GA per stage with as many stages as there are digits in the PCM code.

Each gate 17GA has a timed triggered input, such as 17T1, 17T2, etc., which is energized in coincidence with the application to the other input of the gate 17GA of the respective digit in a "1" condition (if there is one) of the PCM signal, so that a particular gate 17GA will only pass the appropriate digit applied thereto. The output of each gate 17GA is applied to delay units, such as 17DL1, 17DL2 etc., having successively decreasing delay times such that an output from gate 17GA1 is delayed until the occurrence of an output from the final gate 17GA4, an output from gate 17GA2 is delayed until the occurrence of the 17GA4 output, and so on, with delay unit 17DL4 having zero delay time.

Thus, all outputs from the delay units 17DL appear in coincidence on the inputs to square wave pulse generators, such as 17GEN1, 17GEN2 etc. Generator 17GEN1 is arranged, when energized by an input thereto, to deliver a single square wave output pulse persisting for the first half of the sampling period W, i.e., the pulse lasts for W/2.

Generator 17GEN2 when energized delivers a recurring square wave output pulse train with each pulse persisting for W/4. The remaining pulse generators 17GEN3 and 17GEN4 in like manner when energized each deliver a recurring square wave output pulse train, with each pulse persisting for W/8 and W/16, respectively.

The outputs of the generators 17GEN2, 17GEN3 etc., are applied to respective gates such as 17GB2, 17GB3 etc., each of which delivers an output corresponding to the input, providing it is not inhibited by a blanking pulse derived from any output of earlier generators 17GEN.

The outputs from gates 17GB2, 17GB3, etc., are fed back via delay units 14DL2A, 14DL3A etc., respectively, each having a delay slightly greater than that of the respective first delay unit 17DL in that stage, to turn off the generator 17GEN in that stage after that generator has delivered single effective square wave output in the appropriate time position, and summation of the effective square wave outputs passing through the gates 17GB and from generator 17GEN1 is performed in combining unit 17CU to give the required PWM output.

Considering a PCM input signal of 1011 (FIG. 18a), gates 17GA1 to 17GA4 are triggered in turn to pass the corresponding digit applied thereto, the triggering pulses being shown in FIGS. 18b to 18e for successive gates.

Figure 18:
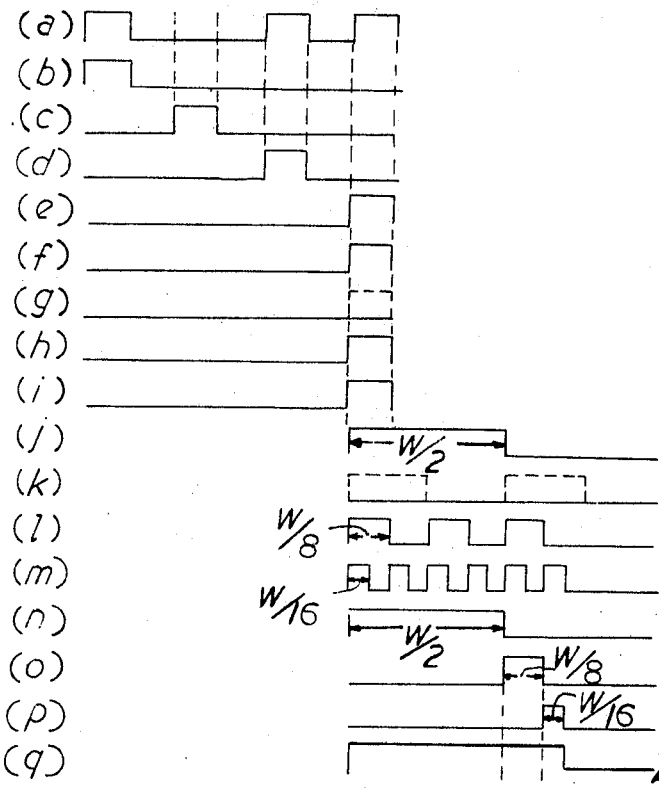
FIG. 18 shows waveforms at selected points in FIG. 17.

The three "1" digits of the PCM signal pass through the gates 17GA1, 17GA3 and 17GA4 and are delayed by delay units 17DL1, 17DL3 and 17DL4, respectively, to become time coincident with the final digit of the signal (FIGS. 18f, h and i). There is no output from gate 17GA2 in this example and, hence, no output from the delay unit 17DL2 (FIG. 18g in which a digit "1" if present is indicated in dashed outline, would likewise be brought into coincidence).

The delayed output from delay unit 17DL1 causes generator 17GEN1 to deliver an output of W/2 (FIG. 18j), commencing in coincidence with the leading edge of the final digit of the PCM signal. This output is applied as a blanking pulse to inhibit all gates 17GB2, 17GB3 etc., for a period of W/2. Thus, although delay units 17DL3 and 17DL4 each deliver an output to energize the respective generators 17GEN3 (FIG. 18l) and 17GEN4 (FIG. 18m), there is no output from the gates 17GB3 and 17GB4 for a period of W/2.

There is in fact no output from delay unit 17DL2 and the generator 17GEN2 is not energized (FIG. 18k), but if there had been an output the generator 17GEN2 would have delivered its output as shown in dashed outline. The blanking pulse from 17GEN1 is, of course, also applied to inhibit the gate 17GB2.

At the end of the W/2 period of the blanking pulse from 17GEN1, the gates 17GB2, 17GB3 etc., revert to the open condition.

A single square wave output pulse of W/8 from generator 17GEN3 is then permitted to pass through gate 17GB3, after which this pulse is utilized via the delay unit 14DL3A having a delay slightly greater than W/8, to turn off the generator 17GEN3. The output from gate 17GB3 is also passed via an isolating stage 17IS3B to apply a blanking pulse to gate 17GB4 to inhibit that gate for a further period of W/8 immediately following the first inhibit period of W/2. An isolating stage 17IS3A prevents feedback of the blanking pulse to the preceding stages.

At the end of this W/8 inhibit period, the gate 17GB4 is open to pass the output from generator 17GEN4. A single square wave output pulse of W/16 from 17GEN4 passes through gate 17GB4, after which this pulse is utilized via delay unit 17DL4A, having a delay slightly greater than W/16, to turn off the generator 17GEN4.

The outputs from generator 17GEN1 (FIG. 18n), gate 17GB3 (FIG. 18o) and gate 17GB4 (FIG. 18p) are combined in the combining unit 17CU to give the PWM output of W/2+W/8+W/16 (FIG. 18q). Unit 17CU, for example, may include a load resistor common to the inputs to unit 17CU.

The decoder shown in FIG. 19 functions in a series form, delivering a PWM output, and comprises as many stages as there are digits in the PCM code, the PCM signal being applied to input 19. Each stage includes a pair of coincidence gates, such as 19GA1, 19GB1; 19GA2, 19GB2; etc. Each pair of gates 19GA, 19GB is triggered by a first input 19TA, 19TB, respectively, so that 19GB is open to pass a digit pulse applied thereto while 19GA is closed to that digit pulse. Triggering of the pairs of gates in successive stages is timed so that the gate 19GB in that stage is open to pass the digit in the "1" condition corresponding to that stage, if there is such a digit, and is closed for the remainder of the sampling period, while the gate 19GA in that stage is closed for the time of the applied digit pulse and open for the remainder of the sampling period.

It will be seen, therefore, that for any one stage, if there is a digit pulse applied thereto in the appropriate time slot, gate 19GB will pass this digit pulse and the output from the gate 19GB causes the flip-flop, such as 19FF1, 19FF2 etc., to be flipped, but a flipped flip-flop delivers no output at this time.

Associated with each flip-flop 19FF are forms of routing gates, such as 19G1, 19G2 etc.

Derivation of the PWM output is initiated by a synchronizing pulse obtained by differentiation of the leading edge of the next occurring PCM signal, this synchronizing pulse being applied to a second input 19A. The flip-flops 19FF and gates 19G are so arranged that if the flip-flop is flipped by output from the associated gate 19GB, an applied synchronizing pulse re-sets the flip-flop which then delivers an output to an associated single shot blocking oscillator, such as 19BO1, 19BO2 etc., successive blocking oscillators delivering a square wave output of W/2, W/4, W/8, etc. If, however, the flip-flop has not been flipped, the applied synchronizing pulse is routed to bypass that flip-flop and to be applied to the next flip-flop to reset it if it had been flipped.

A reset flip-flop delivering an output causes the associated blocking oscillator 19BO to deliver its square wave output, and an energized blocking oscillator 19BO also delivers an output via a differentiating and isolating stage, such as 19DI1, 19DI2, etc., to simulate the synchronizing pulse for resetting the flip-flop in the next stage.

Summation of the square wave outputs of all energized blocking oscillators 19BO in the combining unit 19CU produces the required PWM output of the decoder.

Considering an input PCM signal of 1011 (FIG. 20a), flate 19GA1 is closed during the time slot of the first digit (FIG. 20b) and gate 19GA1 is open (FIG. 20c), so that gate 19GB1 delivers an output to the flip-flop 19FF1. Gate 19GA1 is open for the remainder of the signal, so the remaining digits of the signal pass through gate 19GA1 and are applied to the second stage. The gates 19GA2 and 19GB2 of this stage are closed and opened, respectively, for a second digit (FIGS. 20d and 20e), but there is no second digit in this example. Accordingly there is no output from gate 19GB2 and the flip-flop 19FF2 is unaffected.

The last two digits of the signal pass through the open gate 19GA2 and are applied to the third stage in which gate 19GA3 is closed (FIG. 20f) and gate 19GB3 is open (FIG. 20g) in coincidence of the occurrence with the third digit. Gate 19GB delivers an output to flip-flop 19FF3. The final signal digit passes through the open gate 19GA3 and is applied to the fourth stage where gate 19GB4 is open (FIG. 20i) and delivers an output to flip-flop 19FF4.

At the commencement of the next PCM signal period, a character synchronizing pulse (FIG. 20j) is applied to 19G1, and, since flip-flop 19FF1 has been flipped, the routing of the synchronizing pulse is to the flip-flop 19FF1 to reset it, the output therefrom on resetting being applied to cause the blocking oscillator 19BO1 to deliver an output pulse of W/2 (FIG. 20k).

The trailing edge of the W/2 output is differentiated by 19DI1 (FIG. 20l) to simulate the synchronizing pulse which is then applied to gate 19G2 of the second stage. Since the flip-flop 19FF2 remained reset, the routing of this synchronizing pulse is to the third stage where it causes resetting of flip-flop 19FF3, the output therefrom on resetting being applied to cause the blocking oscillator 19BO3 to deliver an output pulse of W/8 (FIG. 20m).

The trailing edge of this W/8 output is differentiated by 19DI3 (FIG. 20n) to simulate the synchronizing pulse for the fourth stage. Flip-flop 19FF4 is reset to deliver an output to the blocking oscillator 19BO4 which delivers an output pulse of W/16 (FIG. 20o).

The PWM output is the summation of these three outputs from the blocking oscillators 19BO1, 19BO3 and 19BO4, and is shown in FIG. 20p and consists of a square wave output of W/2+W/8+W/16. Combining unit 19CU, providing that PWM output, may include, for example, a load resistor coupled in common to the inputs to unit 19CU.

All the embodiments described above have been based on the use of a simple binary code. This code has the advantage of simplicity, but suffers from the disadvantage that changes in a number of decisions are made simultaneously when the pulse width to be coded is nearly an exact multiple of the width of the gating waveforms. In this region, some coding errors are introduced which although negligible in many systems are objectionable when the highest accuracy is necessary. This difficulty can be obviated by the use of the Gray (reflected binary) code. No more than two simultaneous decisions are ever made with this code.

The waveforms may be generated in a similar manner to those already described. However, since they must be shifted in phase with respect to each other, a phase shifting circuit is necessary. This can be achieved simply at high frequencies by a length of transmission line, but at lower frequencies this method is unduly bulky. Lumped equivalent lines are excessively dispersive and cannot be used.

What can be done is to trigger a square wave generator at the lowest frequency (say 10 kc./s.) and from the train by a suitable filter and amplifier, i.e., first, second, third harmonics for first, second, third stages etc. Being sinusoidal, the waveforms are now easily shifted by a compact lumped circuit. The phase-shifted waveform of each selected harmonic is then used to trigger a respective gating oscillator to produce the square gating waveforms required for the respective stage.

This avoids sequential triggering of each gating oscillator. The amount of jitter on the final oscillator triggered at the end of a chain of (say) twelve is likely to be excessive.

It is to be understood that the foregoing description of specific examples of this invention is made by way of example only and is not to be considered as a limitation on its scope.

What we claim is:

1. A signal converter for deriving an N digit pulse code modulation signal representative of an applied pulse time modulated signal comprising:
 a source of said pulse time modulated signal;
 N coding stages to produce said code modulation signal, said stages being coupled to said source;
 a combiner coupled to said stages to produce said code modulation signal;
 each of said stages including
  a first coincidence device coupled to said source, and a pulse generator coupled to said first coincidence device to control the conduction of said first coincidence device for predetermined fractions of a total given time period;
  said generators producing different continuous wave pulse signals related to each other by powers of two for determining said predetermined fractions; and
 (N−1) series circuits connected in cascade with respect to each other and said source;
 each of said series circuits including
  a delay element, and an INHIBIT gate coupled to said delay element in the order named, the input of said delay element of the first of said circuits being coupled to said source and the input of said delay element of subsequent ones of said circuits being coupled to the output of said INHIBIT gate of the preceding one of said circuits; and wherein the input of said first coincidence device of the first of said N stages is connected directly to said source;

the input of said first coincidence device of the second and subsequent ones of said N stages being connected directly to the output of said INHIBIT gate of the first and subsequent ones of said circuits; and the output of said first coincidence device of the first and subsequent ones of said N stages, except the last of said N stages, being coupled to the input of said delay element of the second and subsequent ones of said circuits and said INHIBIT gate of the first and subsequent ones of said circuits.

2. A converter according to claim 1, wherein said delay elements have different values of delay related to each other by powers of two.

3. A signal converter for deriving an N digit pulse code modulation signal representative of an applied pulse time modulated signal comprising:

a source of said pulse time modulated signal;

N coding stages to produce said code modulation signal, said stages being coupled to said source;

a combiner coupled to said stages to produce said code modulation signal;

each of said stages including a first coincidence device coupled to said source, and a pulse generator coupled to said first coincidence device to control the conduction of said first coincidence device for predetermined fractions of a total given time period;

said generators producing different continuous wave pulse signals related to each other by powers of two for determining said predetermined fractions; and (N—1) first delay elements connected in cascade with respect to each other and said source; and wherein said first coincidence device of the first of said N stages is connected directly to said source;

the input of said first coincidence device of the second and subsequent ones of said N stages being connected directly to the output of the first and subsequent ones of said first delay elements; and each of said N stages further include a second delay element coupled to the output of said first coincidence device, an oscillator coupled between the output of said second delay element and said combiner, and blanking means coupled to the output of said first coincidence device and said generator to produce a blanking signal for coupling to said first coincidence device of the succeeding ones of said N stages to render said first coincidence device nonconductive during the time said first coincidence device of preceding ones of said N stages is rendered conductive.

4. A converter according to claim 3, wherein said first delay elements have different values of delay related to each other by powers of two, and said second delay elements have different values of delay related to each other by powers of two.

5. A signal converter for deriving a N digit pulse code modulation signal representative of an applied pulse time modulated signal comprising:

a source of said pulse time modulated signal;

N coding stages to produce said code modulation signal, said stages being coupled to said source;

a combiner coupled to said stages to produce said code modulation signal;

each of said stages including a first coincidence device coupled to said source, and a pulse generator coupled to said first coincidence device to control the conduction of said first coincidence device for predetermined fractions of a total given time period;

said generators producing different continuous wave pulse signals related to each other by powers of two for determining said predetermined fractions;

a differentiator coupled to said source; and a differentiator-inverter coupled to said source; and wherein each of said N stages further include a bistable device coupled to the output of said first coincidence device and said differentiator-inverter, an oscillator coupled between the output of said bistable device and said combiner, a second coincidence device, and an inverter coupled between said generator and said second coincidence device;

the input of said first and second coincidence devices of the first of said N stages being coupled to said differentiator; and the input of said first and second coincidence devices of the second and subsequent ones of said N stages being coupled to the output of said first and second coincidence devices of the preceding one of said N stages.

6. A signal converter for deriving an N digit pulse code modulation signal representative of an applied pulse time modulated signal comprising:

a source of said pulse time modulated signal;

N coding stages to produce said code modulation signal, said stages being coupled to said source;

a combiner coupled to said stages to produce said code modulation signal;

each of said stages including a first coincidence device coupled to said source, and a pulse generator coupled to said first coincidence device to control the conduction of said first coincidence device for predetermined fractions of a total given time period;

said generators producing different continuous wave pulse signals related to each other by powers of two for determining said predetermined fractions;

a differentiator coupled to said source; and a differentiator-inverter coupled to said source; and wherein each of said N stages further include a bistable device coupled to the output of said first coincidence device and said differentiator-inverter, a delay element coupled to the output of said bistable device, and an oscillator coupled between said delay element and said combiner; and the input of each of said first coincidence devices is connected directly to the output of said differentiator.

7. A converter according to claim 6, wherein said delay elements have different delay values related to each other by powers of two.

8. A signal converter for deriving a pulse time modulation signal representative of an applied N digit pulse code modulated signal comprising:

a first source of said pulse code modulated signal;

N decoding stages coupled to said first source, each of said N stages being responsive to a different digit of said pulse code modulated signal; and an arrangement coupled to each of said N stages to produce said pulse time modulation signal;

each of said N stages including
- a first coincidence device coupled to said first source, and
- a first timing pulse coupled to said first coincidence device to control the conduction of said first coincidence device for a predetermined fraction of a total given time period;

said first timing pulses being spaced in time relative to each other;

said first timing pulses being produced by a differentiator coupled to said source and N first delay elements coupled to said differentiator, each of said delay elements being coupled to a different one of said first coincidence devices and having a different delay value related to each other by powers of two;

each of said N stages further including
- a second delay element coupled to the output of said first coincidence device; and said arrangement including
- N third delay elements coupled in cascade with respect to each other,
- N switch means, each coupled in shunt relation with a different one of said third delay elements, in cascade with respect to each other and the output of a different one of said second delay elements, the output of said second delay elements controlling the operation of said switch means, and
- a fourth delay element coupled between the input to the first of said third delay elements and the first of said switch means and the output of the first of said first delay elements;

said second delay elements having different values of delay related to each other by powers of two; and said third delay elements having different values of delay related to each other by powers of two.

9. A signal converter for deriving a pulse time modulation signal representative of an applied N digit pulse code modulated signal comprising:
a first source of said pulse code modulated signal;
N decoding stages coupled to said first source, each of said N stages being responsive to a different digit of said pulse code modulated signal; and
an arrangement coupled to each of said N stages to produce said pulse time modulation signal;
each of said N stages including
- a first coincidence device coupled to said first source, and
- a first timing pulse coupled to said first coincidence device to control the conduction of said first coincidence device for a predetermined fraction of a total given time period;

said first timing pulses being spaced in time relative to each other;

the first of said N stages further including
- a first delay element coupled to the output of said first coincidence device; and
- a first pulse generator coupled to the output of said first delay element;

each of the remainder of said N stages further including
- a second delay element coupled to the output of said first coincidence device,
- a second pulse generator coupled to the output of said second delay element,
- an INHIBIT gate having its inhibit input coupled to the output of said first pulse generator and the output of preceding ones of said INHIBIT gate and its input coupled to the output of said second pulse generator, and
- a third delay element coupled between the output of said INHIBIT gate and said second pulse generator in the same one of of said remainder of said N stages; and said arrangement includes
- a combiner coupled to the output of said first pulse generator and the output of said INHIBIT gates;

said first delay element and said second delay element have different values of delay related to each other by powers of two; and said first generator and said second generator producing different pulse waveforms related to each other by powers of two.

10. A signal converter for deriving a pulse time modulation signal representative of an applied N digit pulse code modulated signal comprising:
a first source of said pulse code modulated signal;
N decoding stages coupled to said first source, each of said N stages being responsive to a different digit of said pulse code modulated signal;
an arrangement coupled to each of said N stages to produce said pulse time modulation signal;
each of said N stages including
- a first coincidence device coupled to said first source, and
- a first timing pulse coupled to said first coincidence device to control the conduction of said first coincidence device for a predetermined fraction of a total given time period;

said first timing pulses being spaced in time relative to each other; and a second source of sync pulse;
the first of said N stages further including
- a first bistable device coupled to said first coincidence device,
- a first routing gate coupled to said second source and said first bistable device,
- a first single shot blocking oscillator coupled to the output of said first bistable device,
- a first differentiator coupled to the output of said first blocking oscillator,
- a second coincidence device connected directly to said first source, and
- a second timing pulse coupled to said second device to control the conduction of said second device for said predetermined fraction of said total given time period; and each of the remainder of said N stages further including
- a second bistable device coupled to said first coincidence device,
- a second single shot blocking oscillator coupled to the output of said second bistable device,
- a second differentiator coupled to the output of said second blocking oscillator except in the last of said N stages,
- a second routing gate coupled to the preceding one of one of said first and second routing gates and to the preceding one of one of said first and second differentiators,
- a third coincident device connected directly to the output of the preceding one of one of said second and third coincidence devices, and
- a third timing pulse coupled to said third coincidence device to control the conduction of said third coincidence device for said predetermined fraction of said total given time period;

said first coincidence device of each of said remainder of said N stages is coupled to the output of the preceding one of said second and third coincidence devices;

said second and third timing pulses being time coincidence with said first timing pulses and inverted with respect thereto; and said arrangement including
a combiner coupled to the output of each of said first and second blocking oscillators.

References Cited

UNITED STATES PATENTS

| | | |
|---|---|---|
| 3,016,527 | 1/1962 | Gilbert. |
| 3,020,350 | 2/1962 | Black. |
| 3,313,922 | 4/1967 | Magnin. |
| 2,485,821 | 10/1949 | Gloess et al. _____ 340—347 |
| 2,560,434 | 7/1951 | Gloess et al. _____ 340—347 |
| 2,877,413 | 3/1959 | Muehlner _____ 340—347 |
| 2,888,647 | 5/1959 | Beter et al. _____ 340—347 |
| 3,264,454 | 8/1966 | Davis et al. _____ 340—347 |
| 3,268,886 | 8/1966 | Cox _____ 340—347 |

MAYNARD R. WILBUR, Primary Examiner

CHARLES D. MILLER, Assistant Examiner